US006426150B1

(12) United States Patent
Jenkner et al.

(10) Patent No.: US 6,426,150 B1
(45) Date of Patent: Jul. 30, 2002

(54) SURFACE-MODIFIED INSULATOR AND METHOD OF MODIFYING THE SURFACE OF AN INSULATOR

(75) Inventors: Peter Jenkner; Eckhard Just, both of Rheinfelden; Johannes Liebermann, Lichtenfels-Schoensreuth, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/497,211

(22) Filed: Feb. 3, 2000

(30) Foreign Application Priority Data

Feb. 3, 1999 (DE) ........................................ 199 04 133

(51) Int. Cl.[7] ................................................ B32B 27/28

(52) U.S. Cl. .................... 428/447; 428/426; 428/425.5; 428/429; 428/411.1; 528/36; 528/16; 528/18; 528/17; 528/12; 528/42; 556/458; 524/858; 427/387; 174/137 R; 174/137 A

(58) Field of Search ............................. 428/426, 425.5, 428/429, 447, 411.1; 528/36, 16, 18, 17, 12, 42; 556/458; 524/858; 427/387; 174/137 R, 137 A

(56) References Cited

U.S. PATENT DOCUMENTS 4,189,392 A * 2/1980 Penneck et al.
5,459,198 A * 10/1995 Sharp
6,156,389 A * 12/2000 Brown et al.

FOREIGN PATENT DOCUMENTS

| | | |
|---|---|---|
| DE | 199 04 132 | 8/2000 |
| EP | 0 382 557 | 8/1990 |
| EP | 0 497 189 | 8/1992 |

OTHER PUBLICATIONS

Patent Abstracts of Japan, JP 05–319867, Dec. 3, 1993.

Patent Abstracts of Japan, JP 02–072700, Mar. 12, 1990.

H–H. Stainbach, Elektrotechnische Zeitschrift–A, vol. 96, pp. 126–128, “Wirkungsweise Von Siliconfilmen Auf Hochspannungs–Isolatoren”, 1975.

* cited by examiner

*Primary Examiner*—Robert Dawson
*Assistant Examiner*—Kuo-Liang Peng
(74) *Attorney, Agent, or Firm*—Oblon, Spivak, McClelland, Maier & Neustadt, P.C.

(57) ABSTRACT

The present invention relates to surface-modified insulators obtained by coating an insulator body with a preparation containing at least one organofluorine-functional silane and/or siloxane, at least one mineral acid and at least one metal salt of aluminum(III), tin(II), tin(IV), iron(III) or titanium (III) as catalyst, to a process for their preparation and to the use of the preparation for coating insulators.

14 Claims, 1 Drawing Sheet

SURFACE-MODIFIED INSULATOR AND METHOD OF MODIFYING THE SURFACE OF AN INSULATOR

BACKGROUND OF THE INVENTION

1. Field of the Invention

The present invention relates to a surface-modified insulator and a method of surface-modifying an insulator with a fluoroorganosilane- and/or siloxane-containing preparation 2. Discussion of the Background Insulators are widely employed throughout industry, for example, as high-tension insulators in transformer stations or in transmission lines. These insulators must meet exacting technical requirements for as long as possible under onerous service conditions, in particular under the stress caused by contamination layers of dirt, salt or other deposits.

A contamination layer deposited on the surface of the insulator impairs the electrical insulation capacity. Countermeasures against the effects of such contamination include complex constructional forms with high shield spread and long leakage paths. In addition, heavily contaminated surfaces require manual cleaning at regular intervals.

From "Elektrotechnische Zeitschrift—A", 96 (1995), pages 126 to 128, it is also known to apply a hydrophobic coating of silicone to the surface of an insulator. The insulator surface consequently repels water, thereby avoiding the buildup of a contamination layer by water-dissolved particles. Because of the thus-imparted hydrophobic characteristics, an insulator soiled with a contamination layer retains its electrical properties, since coherent films of water, or moisture zones, are unable to form, and the service life of the insulator is thus extended. A disadvantage, however, is that such siliconization of the surface is not permanent and must be renewed from time to time. This entails a high maintenance effort and an expensive plant shutdown. Moreover, the silicone material required for the hydrophobic coating is expensive.

EP 0 497 189 B1 discloses a process for preparing a water- and oil-repellent adsorbed film in which a substrate having a pre-roughened surface and having active hydrogen groups thereon is contacted with a nonaqueous solution of a surface-active material. The active material contains a fluorocarbon group and a chlorosilyl group or a fluorocarbon group and an alkoxy group. The solvents employed in this method are chlorohydrocarbons, which are at present comparatively expensive and extremely toxic. The application examples mentioned in the reference include high-tension insulators and sparkplugs. However, as noted above, a coating of this type is not permanent under onerous service conditions, since the attachment of coating to the insulator is inadequate.

It is also known to prepare a composition that contains an organofluorine-functional siloxane by controlled acid- or base-regulated hydrolysis and condensation or co-condensation of organofluorine-functional chlorosilanes and/or alkoxysilanes with or without additional precursor components. The pH regulators employed in this case include not only organic or inorganic acids or bases but also acidic or basic salts, such as alkali metal carbonate, alkali metal hydrogen sulfate, alkali metal dihydrogen phosphate, magnesium hydroxide and aluminum acetate. In preparing such a composition it is also known to employ, for example, silicon tetrachloride or else titanium tetrachloride or zirconium tetrachloride, or corresponding metal acid esters, as precursor components.

Such water, solvent- or dispersant-containing compositions are generally employed for the hydrophobic and simultaneously oleophobic and dirt-repellent treatment of substrates or for special modification of the surface properties of the substrates; for example, for the surface treatment of metals, metal oxides, fillers, pigments, glass, enamel, ceramic, building materials, buildings, fibers, textiles, natural substances, plastics, and coating materials. The surface modification may also involve the formation of a protective layer against UV radiation or mechanical, thermal and chemical influences. It is therefore possible, for example, to obtain scratch-resistant, anticorrosive, antiicing, antifouling, antibacterial or antithrombic properties. In addition to the organofunctional groups, the above-noted organofluorine-functional siloxanes generally possess Si-bonded hydroxyl and/or alkoxy groups, which are intended to permit subsequent attachment to the substrate. Here again, however, no satisfactory, i.e., permanent attachment of the coating to the substrate is achieved.

Fluoroalkylsilanes are used in accordance with EP 0 382 557 A1 to coat the surface of inorganic packings which are in turn dispersed in an insulating high-polymer material for the production of water-repellent dielectric materials. Such a procedure is generally very complex and cannot be applied to the modification of the entire surface of workpieces, especially those of glass or ceramic.

SUMMARY OF THE INVENTION

It is therefore an object of the present invention to provide an insulator with a water-, oil-, and dirt-repellent coating having satisfactory adhesion properties.

It is another object of the invention to provide a method for modify the surface of an insulator by means of which the coating can be easily produced.

Yet another object of the invention is to specify a preparation for use in the method and by means of which the coating can be produced.

These and other objects are achieved in accordance with the invention by the present invention, the first embodiment of which provides a surface-modified insulator, that includes:

- an insulator body having a coating on at least a portion thereof prepared from a composition including:
  - at least one organofluorine-functional silane, organofluorine-functional siloxane, or a mixture thereof,
  - at least one mineral acid; and
  - at least one metal salt of a metal selected from the group consisting of aluminum(III), tin(II), tin(IV), iron(III) or titanium(III)

Another embodiment of the invention provides a method of modifying the surface of an insulator, which includes applying to at least a portion of a body of the insulator a coating prepared from a composition including:

- at least one organofluorine-functional silane, organofluorine-functional siloxane, or a mixture thereof;

at least one mineral acid; and at least one metal salt of a metal selected from the group consisting of aluminum(III), tin(II), tin(IV), iron(III) or titanium(III).

Another embodiment of the invention provides an insulator body coating composition, that includes:

at least one organofluorine-functional silane, organofluorine-functional silane, or a mixture thereof;

at least one mineral acid; and at least one metal salt of a metal selected from the group consisting of aluminum(III), tin(II), tin(IV), iron(III) or titanium(III).

BRIEF DESCRIPTION OF THE DRAWINGS

A more complete appreciation of the invention and many of the attendant advantages thereof will be readily obtained as he same becomes better understood by reference to the following detailed description when considered in connection with the accompanying drawings, wherein.

BRIEF DESCRIPTION OF THE PREFERRED EMBODIMENTS

Figure 1:
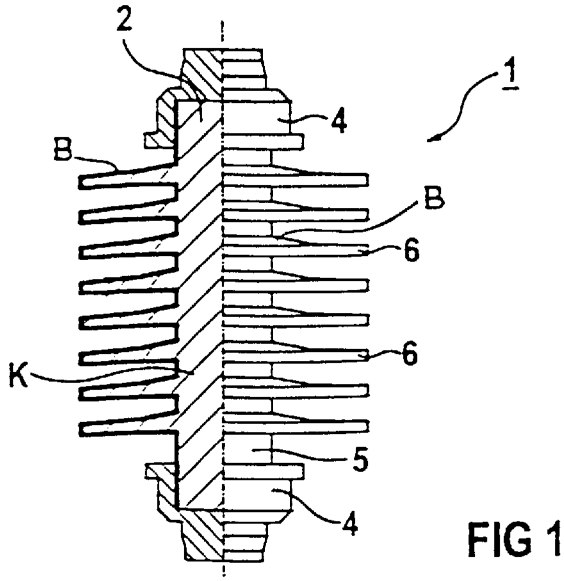
FIG. 1 shows an insulator 1, designed as a high-tension insulator, in a partial cutaway. The insulator 1 has an insulator body 2 made of a ceramic K, and connector caps 4 for connecting and/or guiding current-carrying lines. The body 2 is designed as an essentially cylindrical shank 5 with a number of plate-shaped ribs 6 applied to it The ceramic K, not shown in any more detail here, is coated on its surface with a glaze. On the surface of the glazed ceramic K of the insulator body 2, a water- and oil-repellent coating B of the invention is applied by immersing the insulator body 2 in a preparation as described in Example 1.

Various other objects, features and attendant advantages of the present invention will be more fully appreciated as the same becomes better understood from the following detailed description when considered in connection with the accompanying drawings in which like reference characters designate like or corresponding parts throughout the several views.

It has been found, surprisingly, as also described in a parallel application filed at the German Patent Office and bearing the title "Composition of organofluorine-functional silanes and/or siloxanes, process for preparing them and their use", the entire contents of which being hereby incorporated by reference, that a highly reactive composition containing organofluorine-functional silanes and/or siloxanes carrying predominantly silanol groups is obtained if at least one organofluorine-functional chlorosilane or alkoxysilane, alone or together with further organochlorosilanes or organoalkoxysilanes is mixed with at least one metal salt of aluminum(III), tin(II), tin(IV), iron(IV) or titanium(III) and with at least one mineral acid in the presence of a small amount of water, preferably from 1 ppm by weight to 2% by weight, and this mixture is preferably subjected to partial hydrolysis and, if desired, to condensation or oligomerization. The metal salt may act as a catalyst in combination with the mineral acid and especially when said preparation is employed. A composition or preparation of this kind is preferably used in the present invention for coating the insulator.

The insulator can preferably be made of a ceramic, glass, or an insulating plastic. The ceramic, which is for example a clay ceramic, a porcelain or a steatite, can be unglazed or provided with a glaze in the form of a vitreous melt.

The preparation, when used for coating the insulator, or insulator body, is notable for a particularly rapid and complete reaction with e generally, and preferably, polar, i.e., hydrophilic surface of the insulator. The use of the preparation produces a homogeneous, highly crosslinked coating on the insulator that remains fully and permanently chemically bonded in an outstanding manner, even under weathering effects such as rain, heat, cold and UV exposure; therefore the preparation is advantageously useful for long term use.

Furthermore, it is possible in a simple and economic manner to produce a coating on insulators such that the surface of the modified insulator possesses a particularly good droplet effect, a high roll-off angle, and hence also a low propensity to become soiled. The inherently hydrophilic surface of, for example a glaze or glass becomes suitably water-repellent as a result. The coating of the invention, however, is significantly more resistant than a typical silicone coating.

In addition, coatings of the invention possess outstanding oleophobic, i.e., oil-repellent properties.

The coating of the invention also features excellent pH stability and heat resistance and particular UV stability.

It has also been found that, because of its excellent adhesion to the substrate surface, the coating of the invention is particularly suitable as a surface finish for a high-tension insulator for use in the transmission of electrical energy in both interior and exterior sectors. As a result it is possible to substantially improve the contamination-layer characteristics and increase the flashover voltage, especially on exposure to moisture as a result of precipitation (rain, fog, spray, especially in the maritime sector). As a result, it is also possible to make a significant reduction in laborious cleaning operations, which usually must be cried out manually.

By use of the present invention expensive coating with silicone can be eliminated. Hydrophobically coated ceramic insulators have the additional advantage over the prior art of allowing the choice of simpler and thus more cost-effective designs in manufacture. The wide diversity of types present today can be reduced with advantages in terms of cost.

The present invention therefore provides a surface-modified insulator obtainable by coating the insulator body with a preparation containing at least one organofluorine-functional silane and/or siloxane, at least one mineral acid and at least one metal salt of aluminum(III), tin(II), tin(IV), iron(III) or titanium(III).

The above preparation preferably includes a mineral acid from the group consisting of hydrogen chloride, nitric acid, phosphoric acid and sulfuric acid.

Preferably, the preparation has a metal salt content of 0.01 to 10% by weight and more preferably 0.1 to 7.5% by weight, and a mineral acid content of 0.001 to 5% by weight more preferably 0.01 to 2.5% by weight, the metal salt being selected preferably from chlorides, nitrates, phosphates, hydrogen phosphates, dihydrogen phosphates, sulfates and hydrogen sulfates.

The preparation also preferably includes a solvent and/or dispersant. It may, for example, include an aromatic or aliphatic hydrocarbon or an alcohol or water or a mixture thereof. It is preferred, however, to employ methanol, ethanol, n-propanol, isopropanol, n-butanol, acetone, cyclohexane, n-hexane or toluene as solvent. In general, the solvent or dispersant preferably adds up with the other components of the preparation to 100% by weight, based on the finished weight of the preparation.

In accordance with the invention, an insulator is preferably coated by dipping, spraying, brushing or polishing, and preferably the coating can be followed by thermal after-treatment. Here, the treated workpiece can be heated in an oven preferably at a temperature of 50 to 350° C. for a period from 1 minute to 24 hours, more preferably at 150° C. for 20 to 60 minutes.

The insulator obtained advantageously possesses an organofluorine-functional and metal salt-containing coating whose thickness is preferably from 0.1 to 1000 nm. The thickness of said coat is more preferably from 0.5 to 50 nm and, with particular preference, from 1 to 15 nm.

Through the coating of the invention it is possible to modify the surface properties of said insulators or insulator bodies in the advantageous manner described.

The present invention therefore also provides a method of modifying the surface of an insulator, which preferably includes applying to the insulator body a preparation containing at least one organofluorine-functional silane and/or siloxane, at least one mineral acid and at least one metal salt of aluminum(III), tin(II), tin(IV), iron(III) or titanium(III) and subjecting the coated insulator body, if desired, to thermal after-treatment.

The preparation preferably contains those silanes and/or siloxanes which contain organofluorine-functional groups, in this case most preferably fluoroalkyl-functional groups of the formula $CF_3(CF_2)_m(CH_2)_n$— where m is from 0 to 18 and n is 0 or 2. Especially preferable examples include tridecylfluorooctyl—{$(C_6F_{13})$—$(CH_2)_2$—}, heptadecafluorodecyl-{$(C_8$-$F_{17})(CH_2)_2$—}, nonafluorohexyl-{$(C_4F_9)$—$(CH_2)_2$—$)_2$}, heneicosafluorodecyl-{$(C_{10}F_{21})$—$(CH_2)_2$—}, 3,3,3-trifluoropropyl-{$(CF_3)$—$(CH_2)_2$—} and 3-(1,1,2,2-tetafluoroethoxy)propyl-{$(HC_2F_4)$—O—$(CH_2)_3$—}, and if desired, aminoalkyl groups, examples being 3-aminopropyl, N-2-aminoethyl-3-aminopropyl and N-2-aminoethyl-N'-2-aminoethyl-3-aminopropyl, and also vinyl groups, methacryloxyalkyl groups, an example being 3-methacryloxypropyl, and also alkyl groups, examples being methyl, propyl, isopropyl, n-butyl, isobutyl, t-butyl, n-pentyl, n-hexyl, n-octyl, isooctyl and hexadecyl, or cycloalkyl groups, examples being cyclopentyl and cyclohexyl, or cycloalkylene groups, examples being cyclohexenyl, cyclooctenyl and cyclododecadienyl groups, and also epoxyalkyl and epoxycycloalkyl groups, such as 3-glycidyloxypropyl or 2,3-epoxycyclohexyl groups, not more than one of the organofunctional groups in the siloxane being attached to a silicon whose remaining valences are occupied by —O—Si bonds or OH groups and, if desired, by alkoxy groups or chloro substituents.

The following silanes, for example, can be used to prepare the preparation: organofluorine-functional silanes of the general formula I $$F_3C(CF_2)_m(CH_2)_nSiR^1_yX_{3-y})$$

in which X is chloro or a group RO and R is a linear or branched alkyl radical of 1 to 4 carbon atoms, $R^1$ is a linear, branched or cyclic alkyl group of 1 to 8 carbon atoms, m is from 0 to 18, y is 0, 1 or 2 and n is 0 or 2. Preferable examples include 3,3,4,4,5,5,6,6,7,7,8,8,8-tridecafluorooctyltrimethoxysilane, 3,3,4,4,5,5,6,6,7,7,8,8,8-tridecafluorooocyltrichlorosilane, 3,3,4,4,5,5,6,6,7,7,8,8,8-tridecafluorooctyltriethoxysilane, 3,3,4,4,5,5,6,6,7,7,8,8,9,9,10,10,10-heptadecafluorodecyltriethoxysilane, 3,3,4,4,5,5,6,6,7,7,8,8,9,9,10,10,10-heptadecafluorodecyltrichlorosilane, 3,3,4,4,5,5,6,6,7,7,8,8,9,9,10,10,10-heptadeca-fluorodecyltrimethoxysilane, 3,3,4,4,5,5,6,6,6-nonafluorohexyltriethoxysilane, 3,3,4,4,5,5,6,6,6-nonafluorohexyltrimethoxysilane, 3,3,4,4,5,5,6,6,6-nonafluorohexyltri-chlorosilane, 3,3,4,4,5,5,6,6,7,7,8,8,9,9,10,10,11,11,12,12,12-beneicosafluorododecyltriethoxysilane, 3,3,3-trifuoropropyltrichlorosilane, 3,3,3-trifluoropropyl-trimethoxysilane, 3,3,3-trifluoropropyltriethoxysilane or 3-(1,1,2,2-tetrafluoroethoxy)propyltrimethoxysilane or 3-(1,1,2,2-tetrafluoroethoxy)propyltrichlorosilane and, if desired, other silanes, examples of which include:

amino-functional organosilanes, such as 3-aminopropyltriethoxysilane, 3-aminopropyltrimethoxysilane, 2-aminoethyl-3-aminopropyltrimethoxysilane, N-2-aminoethyl-N'-2-aminoethyl-3aminopropyltrimethoxysilane, bis(3-triethoxysilylpropyl)amine, bis(3-trimethoxysilylpropyl)amine, epoxy-functional organosilanes, such as 3-glycidyloxypropyltrimethoxysilane, 3-glycidyloxypropyltriethoxysilane, 2-(2,3-epoxycyclo-hexyl)ethyltrimethoxysilane, alkylsilanes, such as methyltrichlorosilane, methyltrimethoxysilane, methyltriethoxysilane, n-propyltriethoxysilane, isopropyltrimethoxysilane, octyltrichlorosilane, octyltriethoxysilane, isooctyltrimethoxysilane, hexadecyltrimethoxysilane, octadecyltrichlorosilane, cycloalkylsilanes, such as cyclohexyltrimethoxysilane, cyclopentyltrichlorosilane, cyclohexyltriethoxysilane, cycloalkenylsilanes, such as cyclohexenylethyltriethoxysilane, cyclododecadienyltrichlorosilane, cyclooctenyltimethoxysilane, and also tetraethoxysilane and also vinyltrimethoxysilane, vinyltriethoxysilane, vinyltris(methoxyethoxy)silane or 3-methacryloxypropyltrimethoxy-silane and 3-methacryloxypropyltriethoxysilane, to name but a few. Mixtures of the above-noted silanes may also be used.

Furthermore, it is preferred for the preparations to employ the metal salt in solid or liquid or dissolved form. Particularly preferred metal salts are metal chlorides, especially aluminum(III) chloride, tin(II) chloride, tin(IV) chloride, titaniumn(III) chloride and iron(III) chloride, The metal salt is preferably employed in a total amount of from 0.01 to 10% by weight, more preferably 0.1 to 7.5% by weight based on the finished preparation.

Figure 2:
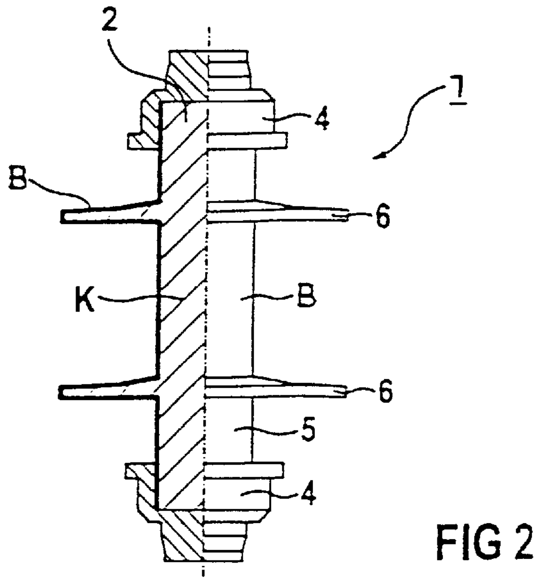
FIG. 2 shows, likewise in partial cutaway, an insulator 7 which is designed as a high-tension insulator and is coated in accordance with the invention In comparison with the insulator 1 of FIG. 1, the number of ribs 6 of the insulator body 2 of ceramic K is reduced. The lengths of the insulators 7 and 1 are identical. However, there are only two ribs 6.
Figure 3:
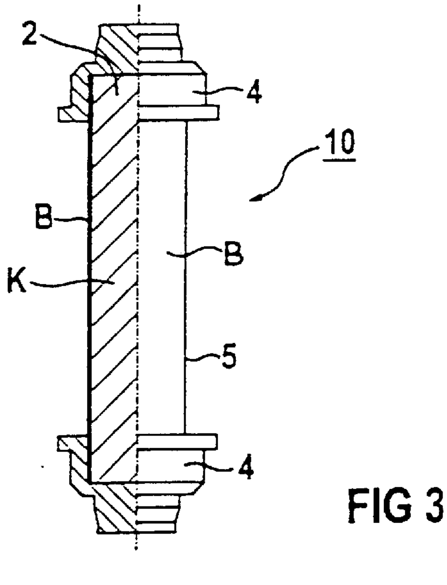
FIG. 3 shows an insulator 10 which is designed as a high-tension insulator but in which, as compared to the insulators 1 and 7 of FIGS. 1 and 2, respectively, the insulator body 2 of ceramic K is reduced to the shank 5. In this case, there are no shields for increasing the leakage path of a leak current between the two connector caps 4 provided here. Since there are no horizontal surfaces, the insulator 10 is additionally protected against dust deposits. As compared to the insulators 1 and 7, the insulator 10 is significantly more advantageous to produce since there is no need for the ceramic material K of the shields 6. The production costs for the insulator 10 are also significantly lower than for insulators 1 and 7 because there is no need for the complex shaping operation for the shields 6. The expensive turning of the shields 6 from the soft shaped body 2 before firing is omitted.

The preferred method of the invention for coating, i.e., for surface-modifying, insulators is generally conducted as follows:

The insulator or insulator body to be treated—cf. also FIGS. 1 to 3—can be cleaned beforehand. This cleaning can take place mechanically and/or chemically by, for example, brushing, neutralization of acid or alkali at a pH of from 0 to 14 with or without subsequent rinsing with fully deionized water, or degreasing of the substrate surface with an appropriate solvent For instance, either a used or a new insulator can be provided for the treatment. Alternatively, the insulator, appropriately an unused one, can be treated in accordance with the invention without special cleaning being carried out beforehand. The insulator is generally coated by dipping, spraying, brushing or polishing in the preparation or by a combination of the aforementioned coating methods.

The treatment time is preferably from a few seconds up to about 1 hour, more preferably from about 1 to 20 minutes, with the duration being critical in some especially preferred cases for the homogeneity of the coating but not, as a general rule, for its thickness. The treatment may be followed by a drying time of preferably from 10 seconds to 24 hours at temperatures from 50 to 350° C. Drying most preferably takes place at from 100 to 200° C. for a period of from 10 to 120 minutes, The drying operation can be carried out in air, under reduced pressure or in an inert gas—for example, under argon or nitrogen, The substrate surface of the insulator or insulator body to be treated may be preferably composed of, for example, ceramic, glass, enamel, metal oxides or plastics, i.e., organic polymers, such as casting resins with various chemical functions and compositions, an example being epoxy resin, or silicones, an example being silicone rubber, or any combination of the above-noted materials.

The metal salt present in the preparation that is used is believed to have the effect, in conjunction with the mineral acid, of bringing about the attachment and condensation of the organofluorine-functional silane or siloxane to the insulator in a surprisingly effective, permanent and thus advantageous manner.

EXAMPLES

Having generally described this invention, a further understanding can be obtained by reference to certain specific examples which are provided herein for purposes of illustration only and are not intended to be limiting unless otherwise specified.

Example 1

The substrates employed are casting-resin sheets and glazed and unglazed porcelain specimens. The porcelains used are identical for all substrates. The glazes used are a gray glaze and a brown glaze which differ only in the color pigments used in each case. Alongside $SiO_2$, $Al_2O_3$ and fluxes, the gray glaze contains metal oxides of cobalt as color pigments. Alongside $SiO_2$, $Al_2O_3$ and fluxes, the brown glaze contains metal oxides of iron, chromium and magnesium as color pigments. The following fluoroalkylsilane systems are used:

Preparation 5.0 g of DS F 8261 (tridecafluoro-1,1,2,2tetrahydrooctyltriethoxysilane), 5.0 g of $H_2O$, 1.0 g of hydrochloric acid, 488.4 g of ethanol and 0.6 g of tin chloride are stirred in a glass flask for 1 h.

The composition is therefore 1.0% by weight DS F 8261, 1.0% by weight $H_2O$, 0.2% by weight hydrochloric acid, 0.12% by weight $SnCl_2x6H_2O$ and 97.68% by weight ethanol.

The solution is used after an aging time of 24 h.

Coating Operation

The workpieces, first cleaned with isopropanol and neutralized with HCl and then rinsed with fully deionized water, are immersed in the preparation for 5 minutes then stood to allow the excess solution to an off, and subsequently after-treated at 150° C. for 1 h. The casting-resin sheets were after-treated at 100° C. for 1 h.

Hydrophobicity Test

The hydrophobic properties are examined by means of a static wetting angle measurement ($H_2O$ ) in accordance with DIN EN 828.

Water Resistance Test

The coated test specimens are boiled in fully deionized water for 5 h.

Then the hydrophobicity is tested, again by means of a static wetting angle measurement.

Results

| | Stat. wetting angle $H_2O$ (°) | After 5 h boiling test stat. wetting angle $H_2O$ (°) |
|---|---|---|
| Casting-resin sheet | | |
| Treated | 103 | 100 |
| Untreated | 98 | — |
| Glazed porcelain specimen | | |
| Treated | 92 | 105 |
| Untreated | 41 | — |
| Unglazed porcelain specimen | | |
| Treated | 120 | 118 |
| Untreated | 18 | — |

Comparative Example

Comparison of ORMOCER (organic modified ceramic)-coated, glazed porcelain test specimens after 5-hour boiling water test:

| Glazed porcelain specimen | ORMOCERs (type) | Stat. Wetting angle $H_2O$ (°) | After 5 h boiling test stat. wetting angle $H_2O$ (°) |
|---|---|---|---|
| Treated | KOE | 74 | 73 |
| Treated | ARA-1 | 86 | 69 |
| Untreated | — | 41 | — |

Example 2

Test specimens in the long-term weathering test: The wetting angles are tested monthly. The porcelain test specimens are taken each month from their weathering position, cleaned and dried at 100° C. for 30 minutes. Then the static wetting angle ($H_2O$) is measured.

| | Static wetting angle $H_2O$ (°) (month(s) after coating) | | | | |
|---|---|---|---|---|---|
| | 1 | 2 | 3 | 4 | 5 |
| Glazed porcelain test specimen | | | | | |
| 1 Gray (treated) | 95 | 95 | 80 | 87 | 91 |
| 2 Brown (treated) | 94 | 103 | 93 | 89 | 92 |
| 3 Ormocer KOE (comparison) | 73 | 83 | 85 | 82 | 76 |
| Unglazed porcelain test specimens | | | | | |
| Treated | 121 | 126 | 126 | 131 | 133 |

The results show the excellent long-term stability of the coatings of the invention in the weathering test.

Example 3

An uncoated, glazed ceramic long-rod insulator of type VKL 75 in accordance with DIN 48 006, having a length of 75 cm, an essentially cylindrical shank and 22 equally spaced, plate-shaped shielding ribs, is compared with a coated, glazed ceramic long-rod insulator of the same type but with 11 equally spaced shielding ribs.

The ceramic of the insulators is an alumina porcelain of type C120 in accordance with DIN-EN 60 672. However, porcelains or ceramics of a different composition make no difference in this case.

The coated long-rod insulator was prepared by dipping the insulator body into a preparation as described already in Example 1.

The electrical insulation capacity of the insulators is tested in accordance with a rain test to IEC 60/1 (1998), instrument specification IEC 383-1=VDE 0446, Part 1, May 1997. In this test the insulators are each suspended in an appropriate area and irrigated with rain of defined intensity at a defined angle.

The flashover voltages are determined from an oscillogram. Five flashover tests are conducted in each case.

Result

The flashover voltage determined for the uncoated long-rod insulator was 376 kV while the flashover voltage determined for the coated insulator was 405 kV. This means that the coated insulator underwent flashover only at a higher voltage despite the shorter leakage path (11 shielding ribs). In technical terns, the result denotes a gain of 9.1% in terms of voltage insulated per mm of insulating length.

Example 4

Glazed ceramic high-tension insulators of type L60/5 in accordance with DIN 48 006, with a shank diameter of 60 mm and five equally spaced shielding ribs, are tested. The shape of the connector caps is unimportant. This type is frequently employed as a railroad insulator. The ceramic is again an alumina porcelain of type C120.

A coated high-tension insulator and an uncoated high-tension insulator are subjected to a salt spray test in accordance with IEC 507 (1991) and VDE 0448, Part 1, 1994. The coating was applied in the same way as specified in Example 1. The results are compared.

For preparation, the high-tension insulators are washed with trisodium phosphate. They are then conditioned in accordance with IEC 507 (1991). After conditioning, the high-tension insulators are subjected to a standing test in air with a defined concentration by mass of salt in each case. Each test lasts for at least one hour provided no flashover occurs. At a voltage of 15 kV (alternating current), the test measures the maximum standing salt mass concentration in accordance with IEC 507 (1991), page 19, i.e., the highest standing salt mass concentration at which the high-tension insulator under investigation shows a maximum of one flashover within the one-hour experimental duration in the case of three experiments.

Result

The standing salt mass concentration found is higher in the case of the coated high-tension insulator by one salt stage in accordance with IEC 507 (1991) than in the case of the uncoated high-tension insulator.

Example 5

The insulators designed in accordance with Example 3 are subjected to a salt spray test in accordance with Example 4. In other words, an 11-shield, coated long-rod insulator is compared with a 22-shield, uncoated long-rod insulator.

Result

The 11-shield coated long-rod insulator exhibits the same standing salt content as the 22-shield uncoated long-rod insulator. This means in practice that it is possible to save at least 30% on a leakage path by virtue of the coating.

This application is based on German Patent Application 19904133.4, filed Feb. 3, 1999, the entire contents of which are hereby incorporated by reference.

Having now fully described the invention, it will be apparent to one of ordinary skill in the art that many changes and modifications can be made thereto without departing from the spirit or scope of the invention as set forth herein.

What is claimed is:

1. A surface-modified insulator, comprising:

an insulator body having a coating on at least a portion thereof prepared from a composition comprising:

at least one organofluorine-functional silane, organofluorine-functional siloxane, or a mixture thereof;

at least one mineral acid; and at least one metal salt selected from the group consisting of the chloride, nitrate, sulfate, hydrogen sulfate, hydrogen phosphate and dihydrogen phosphate of aluminum(III) and the chloride, nitride, sulfate, hydrogen sulfate, phosphate, hydrogen phosphate and dihydrogen phosphate of tin(II), tin(IV), iron (III) or titanium(III).

2. The insulator of claim 1, wherein said mineral acid is selected from the group consisting of hydrogen chloride, nitric acid, phosphoric acid and sulfuric acid, and mixtures thereof.

3. The insulator of claim 1, wherein said composition further comprises a material which is a solvent, dispersant or a mixture thereof.

4. The insulator of claim 1, wherein said composition has a metal salt content of from 0.01 to 10% by weight.

5. The insulator of claim 1, wherein said composition has a mineral acid content of from 0.001 to 5% by weight.

6. The insulator of claim 1, wherein said organofluorine-functional silane or organofluorine-functional siloxane comprises at least one organo functional group of the formula $CF_3(CF_2)_m(CH_2)_n$—, wherein m is from 0 to 18 and n is 0 or 2.

7. The insulator of claim 1, wherein said organofluorine-functional silane or organofluorine-functional siloxane comprises at least one group selected from the group consisting of Si-bonded hydrolyzable group, hydroxyl group, non-hydrolyzable group, and mixtures thereof.

8. The insulator of claim 1, wherein said coating is from 0.1 to 1000 nm thick.

9. The insulator of claim 1, wherein said insulator body comprises a material selected from the group consisting of ceramic, glass, enamel, metal oxide, and plastic, and mixtures thereof.

10. The insulator of claim 3, wherein said solvent, said dispersant or a mixture thereof is an aromatic hydrocarbon, an aliphatic hydrocarbon, an alcohol, water, or mixtures thereof.

11. The insulator of claim 10, wherein said solvent, said dispersant or a mixture thereof is water in an amount from 1 ppm by weight to 2% by weight.

12. The insulator of claim 1, wherein said composition has a mineral acid content of from 0.01 to 2.5% by weight.

13. The insulator of claim 1, wherein said composition has a metal salt content of from 0.1 to 7.5% by weight.

14. The insulator of claim 1, wherein said metal salt is aluminum(III) chloride, tin(II) chloride, tin(IV) chloride, titanium(III) chloride or iron(III) chloride.

* * * * *

UNITED STATES PATENT AND TRADEMARK OFFICE

CERTIFICATE OF CORRECTION

PATENT NO. : 6,426,150 B1 
DATED : July 30, 2002
INVENTOR(S) : Jenkner et al.

It is certified that error appears in the above-identified patent and that said Letters Patent is hereby corrected as shown below:

Title page,
Item [73], Assignee, should read:
-- [73] Assignee: Degussa AG, Duesseldorf (DE)
Siemens Aktiengesellschaft, München (DE) --

Signed and Sealed this

Eighteenth Day of May, 2004

JON W. DUDAS
*Acting Director of the United States Patent and Trademark Office*